United States Patent
Wojtowicz

(10) Patent No.: US 9,264,163 B2
(45) Date of Patent: *Feb. 16, 2016

(54) METHOD AND APPARATUS FOR MULTIPLEXING ETHERNET CHANNELS

(71) Applicant: Broadcom Corporation, Irvine, CA (US)

(72) Inventor: Jaroslaw Wojtowicz, Santa Rosa, CA (US)

(73) Assignee: Broadcom Corporation, Irvine, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/931,412

(22) Filed: Jun. 28, 2013

(65) Prior Publication Data

US 2013/0287050 A1 Oct. 31, 2013

Related U.S. Application Data

(63) Continuation of application No. 10/918,668, filed on Aug. 12, 2004, now Pat. No. 8,483,246.

(60) Provisional application No. 60/494,106, filed on Aug. 12, 2003, provisional application No. 60/494,107, filed on Aug. 12, 2003.

(51) Int. Cl.
*H04J 3/22* (2006.01)
*H04J 3/04* (2006.01)

(52) U.S. Cl.
CPC ..... *H04J 3/22* (2013.01); *H04J 3/04* (2013.01); *H04J 3/047* (2013.01)

(58) Field of Classification Search
None
See application file for complete search history.

(56) References Cited

U.S. PATENT DOCUMENTS

| | | |
|---|---|---|
| 5,790,057 A | 8/1998 | Linde et al. |
| 6,311,239 B1 | 10/2001 | Matthews |
| 6,690,682 B1 | 2/2004 | Giaretta et al. |
| 7,050,468 B2 | 5/2006 | Seto et al. |
| 7,218,648 B1 | 5/2007 | Jackson |
| 7,295,554 B1 * | 11/2007 | Krishnamoorthy et al. .. 370/394 |
| 7,308,006 B1 | 12/2007 | Banerjee et al. |

(Continued)

FOREIGN PATENT DOCUMENTS

EP 1416656 A2 5/2004

OTHER PUBLICATIONS

International Search Report directed to related International Application No. PCT/US2004/026563, from the European Patent Office, Rijswijk, The Netherlands, mailed Dec. 6, 2004; 3 pages.

(Continued)

*Primary Examiner* — Habte Mered
(74) *Attorney, Agent, or Firm* — Sterne, Kessler, Goldstein & Fox P.L.L.C.

(57) ABSTRACT

One embodiment of the present invention provides a system that facilitates multiplexing low-speed Ethernet channels onto a high-speed channel. During operation, the system receives a number of low-speed Ethernet channels. Next, the system derives N bit streams from the number of low-speed Ethernet channels, and feeds each bit stream to an input of a serializer, which is conventionally used to serialize bits from a single channel. Each input of the serializer comprises one bit of an N-bit-wide parallel input bus, and the data rate of the serializer output matches the data rate of the high-speed channel. The system then transmits the output of the serializer onto the high-speed channel.

20 Claims, 9 Drawing Sheets

(56) References Cited

U.S. PATENT DOCUMENTS

| | | |
|---|---|---|
| 7,656,905 B2 | 2/2010 | Sheth et al. |
| 2003/0099260 A1* | 5/2003 | Bunton ................... 370/535 |
| 2003/0147654 A1 | 8/2003 | Sung et al. |
| 2003/0161353 A1 | 8/2003 | Kuo et al. |
| 2003/0185251 A1 | 10/2003 | Ichino et al. |
| 2004/0257248 A1* | 12/2004 | Lund et al. ................. 341/58 |
| 2005/0036524 A1 | 2/2005 | Wojtowicz |

OTHER PUBLICATIONS

International Preliminary Report on Patentability and Written Opinion directed to related International Application No. PCT/US2004/026563, from the International Bureau of WIPO, Geneva, Switzerland, mailed Feb. 13, 2006; 6 pages.

* cited by examiner

METHOD AND APPARATUS FOR MULTIPLEXING ETHERNET CHANNELS

RELATED APPLICATION

This application is a continuation of U.S. patent application Ser. No. 10/918,668, filed Aug. 12, 2004, now assigned U.S. Pat. No. 8,483,246, which claims priority to U.S. Provisional Patent Application Nos. 60/494,100 and 60/494,107, both filed Aug. 12, 2003, all of which are hereby incorporated by reference in their entireties.

BACKGROUND

1. Field of the Invention

The present invention relates to the design of Ethernet networks. More specifically, the present invention relates to a method and apparatus for multiplexing low-speed Ethernet channels onto a high-speed Ethernet link.

2. Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies that are presently being developed, Ethernet networks are one of the best candidates for next-generation access networks. A combination of ubiquitous Ethernet technology with inexpensive high-speed optical transmission equipment is a very attractive solution. For example, Gigabit Ethernet (GbE) over an optical link offers the simplicity and scalability of Ethernet with the cost-efficiency and high capacity of passive optics. In particular, due to the high bandwidth of optical fibers, GbE networks are capable of accommodating broadband voice, data, and video traffic simultaneously. Furthermore, GbE networks are more suitable for Internet Protocol (IP) traffic, because Ethernet frames can directly encapsulate native IP packets with different sizes, whereas incumbent Asynchronous Transfer Mode (ATM) networks use fixed-size ATM cells and consequently require packet fragmentation and reassembly.

Typically, an Ethernet local area network (LAN) operates at a 10 Mbps or 100 Mbps data rate. Although GbE provides a cost-effective high-speed transmission solution, a single user most likely cannot fully utilize the entire bandwidth of an GbE link. Therefore, it is desirable to aggregate multiple low-speed Ethernet channels onto a high-speed Ethernet link. However, existing traffic aggregation techniques are based on packet-level multiplexing, which requires intensive processing and complicated software control. As a result, the costs of these packet-level-multiplexing solutions are quite high.

Hence, what is needed is a method and an apparatus for multiplexing low-speed Ethernet channels onto a high-speed Ethernet link without incurring much processing overhead.

SUMMARY

One embodiment of the present invention provides a system that facilitates multiplexing low-speed Ethernet channels onto a high-speed channel. During operation, the system receives a number of low-speed Ethernet channels. Next, the system derives N bit streams from the number of low-speed Ethernet channels, and feeds each bit stream to an input of a serializer, which is conventionally used to serialize bits from a single channel. Each input of the serializer comprises one bit of an N-bit-wide parallel input bus, and the data rate of the serializer output matches the data rate of the high-speed channel. The system then transmits the output of the serializer onto the high-speed channel.

In a variation of this embodiment, the low-speed Ethernet channels are 125 MHz Ethernet channels; the high-speed channel has a data rate of 1.25 GHz; N is equal to ten; and the number of low-speed Ethernet channels is ten. The system marks at least one low-speed Ethernet channel with at least one special bit pattern that can be recognized by a demultiplexer, thereby allowing the demultiplexer to: demultiplex the high-speed channel into the number of low-speed Ethernet channels; to identify the marked low-speed Ethernet channel; and to properly distribute the demultiplexed low-speed Ethernet channels based on the relative position of the marked channel.

In a further variation, marking the low-speed Ethernet channel with at least one special bit pattern involves using at least one unique character to represent idles between Ethernet frames, wherein the unique character does not occur in conventional 4 B/5 B Ethernet encoding based on IEEE 802.3 Standards.

In a further variation, marking the low-speed Ethernet channel with at least one special bit pattern involves using a set of unique characters to represent idles and to represent "0" and "1", thereby allowing the low-speed Ethernet channel to carry additional information through the idles between Ethernet frames.

In a further variation, the system uses the unique idle characters which represent "0" and "1" to carry operation, administration, and maintenance (OA&M) information.

In a variation of this embodiment, the low-speed Ethernet channels are 125 MHz Ethernet channels; the high-speed channel has a data rate of 1.25 GHz; N is equal to ten; and the number of low-speed Ethernet channels is eight. Deriving ten bit streams based on the eight low-speed Ethernet channels involves feeding the eight low-speed Ethernet channels as eight bit streams in parallel into an 8 B/10 B encoder, which encodes every eight parallel bits into ten parallel bits based on an 8 B/10 B encoding scheme.

In a further variation, the system uses unique characters to represent idles between Ethernet frames on at least one low-speed Ethernet channel, wherein the unique characters do not occur in conventional 4 B/5 B Ethernet encoding based on IEEE 802.3 Standards. In addition, the system uses the unique characters to represent "0" and "1" and to carry OA&M information.

One embodiment of the present invention provides a system that facilitates demultiplexing a high-speed channel to low-speed Ethernet channels. During operation, the system receives a serial bit stream from a high-speed channel. Next, the system feeds the serial bit stream into the input of a de-serializer, wherein the output of the de-serializer is an N-bit-wide parallel bus output producing N bit streams. The system then obtains a number of low-speed Ethernet channels from the N bit streams.

In a variation of this embodiment, the low-speed Ethernet channels are 125 MHz Ethernet channels; the high-speed channel has a data rate of 1.25 GHz; N is equal to ten; and the number of low-speed Ethernet channels is ten. The system detects at least one special bit pattern within at least one low-speed Ethernet channel. The system then identifies the low-speed Ethernet channel marked with the special bit pattern and properly distribute the low-speed Ethernet channels based on the relative position of the marked channel.

In a further variation, detecting the special bit pattern within a low-speed Ethernet channel involves detecting at least one unique character representing idles between Ethernet frames, wherein the unique character does not occur in conventional 4 B/5 B Ethernet encoding based on IEEE 802.3 Standards.

In a further variation, detecting the at least one special bit pattern within a low-speed Ethernet channel involves detecting a set of unique characters representing idles and representing "0" and "1", which carry additional information through the idles between Ethernet frames.

In a further variation, the system receives OA&M information carried by the unique idle characters which represent "0" and "1".

In a variation of this embodiment, the low-speed Ethernet channels are 125 MHz Ethernet channels; the high-speed channel has a data rate of 1.25 GHz; N is equal to ten; and the number of low-speed Ethernet channels is eight.

In a further variation, the system detects whether the received high-speed channel is 8 B/10 B encoded.

In a further variation, detecting whether the received high-speed channel is 8 B/10 B encoded involves determining whether a ten-parallel-bit word emerging from the ten bit streams is among the set of the ten-bit words used for 8 B/10 B encoding.

In a further variation, if the high-speed channel is 8 B/10 B encoded, obtaining a number of low-speed Ethernet channels based on the ten bit streams involves feeding the ten bit streams which are the output of the de-serializer into an 10 B/8 B decoder, which decodes every ten-parallel-bit word into an eight-parallel-bit word.

In a further variation, the system detects unique characters which represent idles between Ethernet frames on at least one low-speed Ethernet channel and which in addition represent "0" and "1", wherein the unique characters do not occur in conventional 4 B/5 B Ethernet encoding based on IEEE 802.3 Standards. In addition, the system receives OA&M information carried by the unique idle characters.

DETAILED DESCRIPTION

Figure 1:
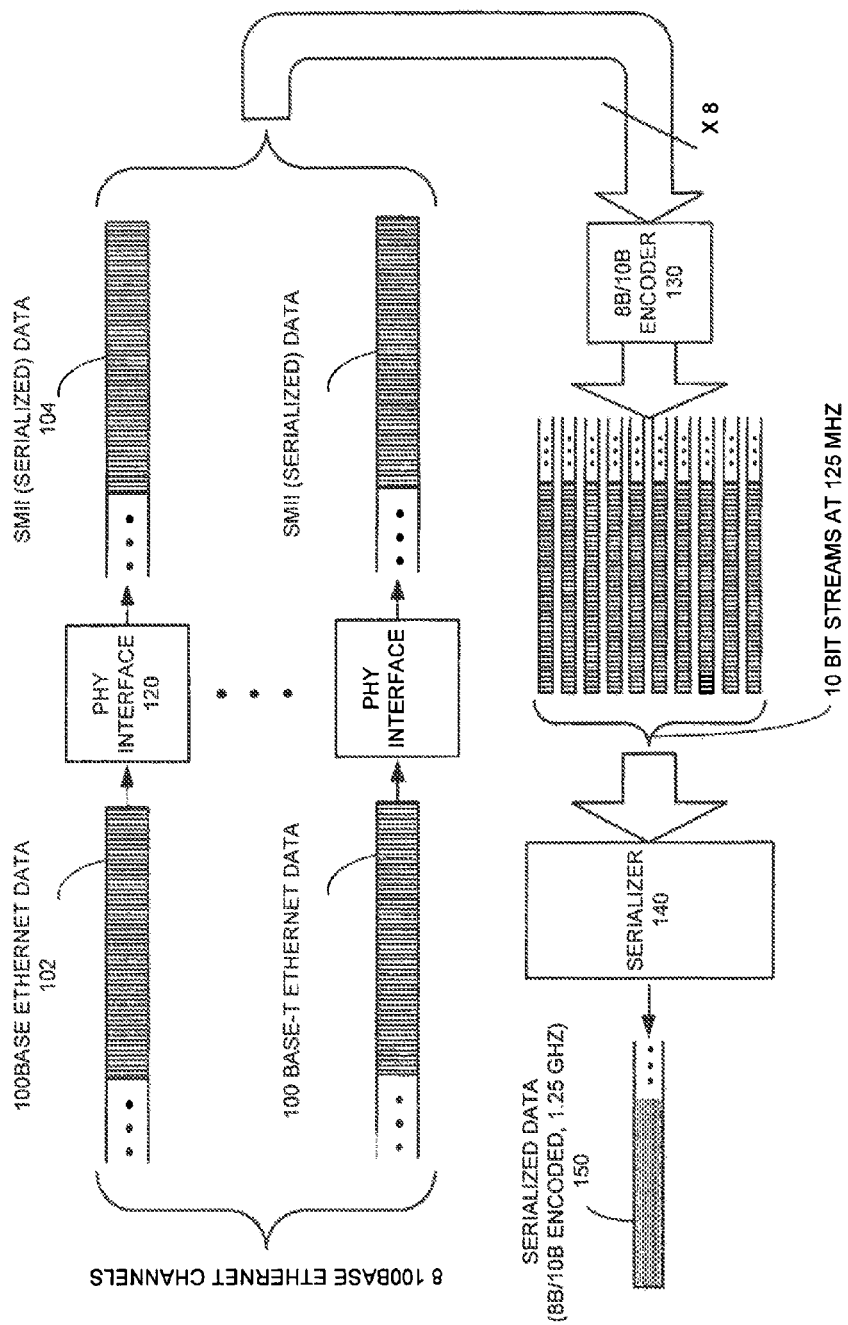
FIG. 1 illustrates an Ethernet bit-level multiplexer for eight 100 Base Ethernet channels with 8 B/10 B encoding in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The data structures and procedures described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated).

Bit-Level Multiplexing with Minimum Processing

Conventional Ethernet multiplexing schemes perform packet-level multiplexing. In such multiplexing schemes, a number of low-speed Ethernet channels feed into a multiplexing device, which buffers all the received Ethernet frames and transmits them at a higher data rate onto a high-speed Ethernet link. The data carried on the high-speed link is complete Ethernet frames, similar to those carried on the low-speed links. The only difference is that the duration of each bit on the high-speed link is much shorter than that on the low-speed link.

Packet-level multiplexing is a costly solution. First, the multiplexer needs to process the Ethernet frame headers to properly aggregate and disseminate the frames. Second, the multiplexer typically requires complex queuing mechanism to buffer the received packets, and to guarantee fair allocation of bandwidth among all the tributary low-speed channels. In addition, extra latency and timing jitter could be introduced to the Ethernet frames due to buffering. As a result, a packet-level multiplexing chip incurs higher cost and is more error-prone.

A more elegant solution to the multiplexing problem, is bit-level multiplexing. Bit-level multiplexing operates directly on the physical layer, does not require complex management and control, and can easily achieve fair bandwidth allocation. The challenge, however, is to implement bit-level multiplexing in a simple and low-cost way, because there is currently no readily available Ethernet bit-level multiplexing chip. To develop a new chip for this purpose, although possible, is not the most cost-effective approach, because the long development cycles may incur additional cost.

One way to realize bit-level multiplexing is to use off-the-shelf serializer/deserializer (SERDES) chips. Typically, a SERDES chip is used to convert a multiple-bit-wide bus for one Ethernet channel into a serial bit stream. For example, the serializer of a GbE SERDES chip accepts a 10-bit-wide GbE input bus with 10 parallel bit streams running at 125 MHz, and converts it into a serial bit stream running at 1.25 GHz.

FIG. 1 illustrates an Ethernet bit-level multiplexer for eight 100 Base Ethernet channels with 8 B/10 B encoding in accordance with an embodiment of the present invention. During operation, the system receives eight 100 Base Ethernet channels from the users. Each channel, for example channel 102, carries 100 Base Ethernet data which is typically 4 B/5 B encoded. The eight 100 Base channels are received by eight individual physical-layer (PHY) interfaces, such as PHY interface 120. PHY interface 120 is responsible for receiving data from a physical medium, for example a CAT-5 cable, and convert the data into a digital format. The output of a PHY interface can be parallel (such as a media-independent interface (MII)), or serial (such as a serial media-independent interface (SMII)). One embodiment of the present invention uses eight PHY interfaces with SMII outputs for receiving the eight 100 Base Ethernet channels.

As a result, the output of PHY interface 120 is a stream of serialized digital data 104 running at 125 MHz. The outputs of the eight PHY interfaces are then fed into an 8 B/10 B encoder 130. The 8 B/10 B encoding scheme is a widely used technique for balancing running parity on an Ethernet link. In 8 B/10 B encoding, every 8-bit word is mapped to two 10-bit words. The selection of the 10-bit word depends on the current running parity on the link.

When an 8 B/10 B encoder is used in a conventional Ethernet context, its 8-bit parallel input are actual 8-bit words as part of the data on an Ethernet channel. Here, however, because each serial bit stream feeding into an input of 8 B/10 B encoder is from a separate Ethernet channel, the 8-bit parallel input does not represent a meaningful word. Nevertheless, 8 B/10 B encoder 130 produces a balanced running parity on the GbE outgoing link.

The output of 8 B/10 B encoder 130, a 10-bit parallel output, is then fed into a serializer 140. Serializer 140 multiplexes ten 125 MHz bit streams into one 1.25 GHz serial bit stream for transmission on a GbE link. Note that because the data is 8 B/10 B encoded, the bit stream on the outgoing GbE link has a balanced running parity and hence is more error-resistant.

For the multiplexer to function properly, it is important that the eight bit streams from the PHY interfaces are synchronized on the bit level. Frequency locking among the eight PHY interfaces can be obtained by providing a common 125 MHz clock to all the PHY interfaces. In addition, to lock in the frequency at the receiver end, a phase-locking loop (PLL) may be used on the receiver side such that bit-synchronization can be obtained across the GbE link.

Figure 2:
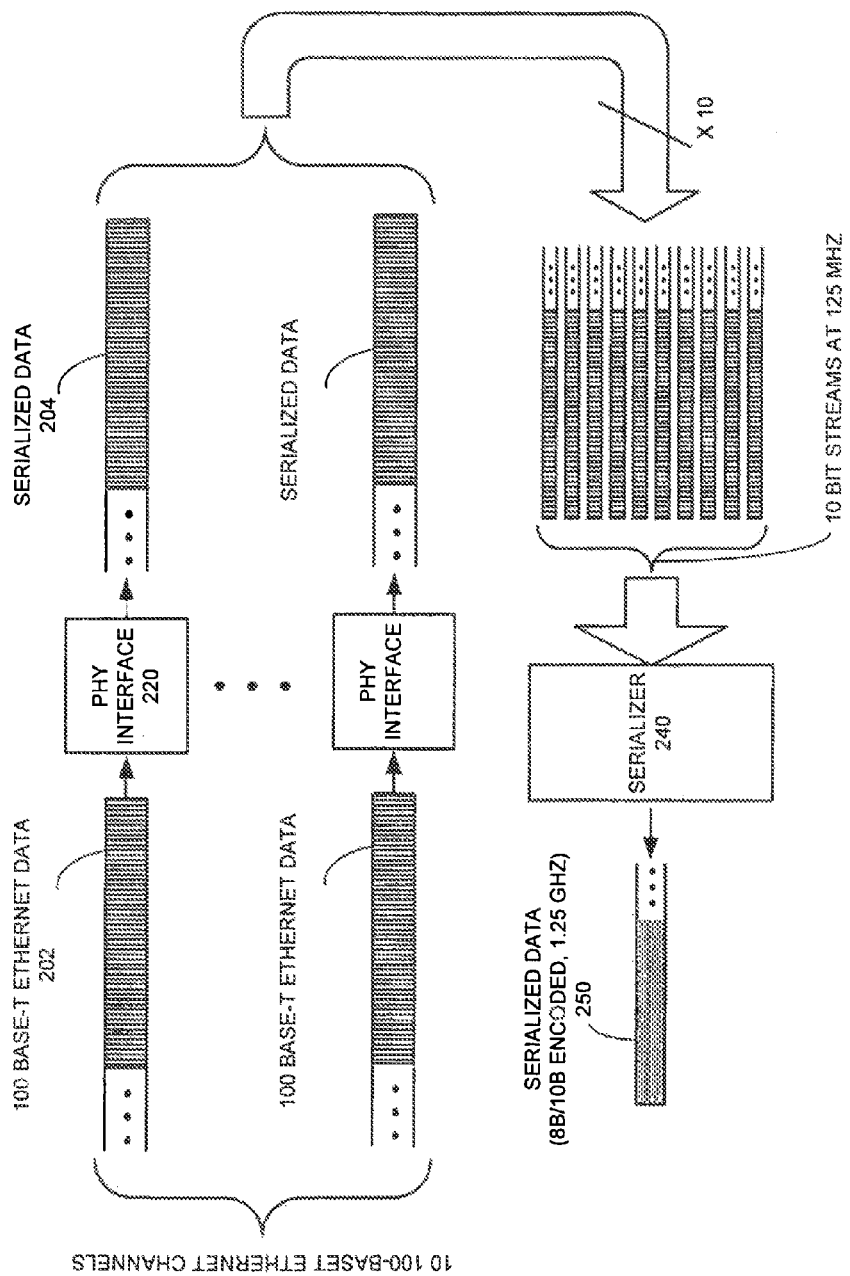
FIG. 2 illustrates an Ethernet bit-level multiplexer for ten 100 Base Ethernet channels without 8 B/10 B encoding in accordance with an embodiment of the present invention.

An alternative to using 8 B/10 B encoding in the multiplexing process, is to bypass the 8 B/10 B encoding and to directly use ten 100 Base Ethernet channels. FIG. 2 illustrates an Ethernet bit-level multiplexer for ten 100 Base Ethernet channels without 8 B/10 B encoding in accordance with an embodiment of the present invention. During operation, the system receives ten 100 Base Ethernet channels from the users. Each channel, for example channel 202, carries 100 Base Ethernet data which is typically 4 B/5 B encoded. The ten 100 Base channels are received by ten individual PHY interfaces, such as PHY interface 220.

The output of PHY interface 120 is a stream of serialized digital data 204 running at 125 MHz. The outputs of the ten PHY interfaces are then directly fed into a serializer 240, which multiplexes the ten 125 MHz bit streams into one 1.25 GHz serial bit stream for transmission on a GbE link. Note that because the data is not 8 B/10 B encoded, the bit stream on the outgoing GbE link most likely does not have a balanced running parity and hence is more error prone.

Although the above descriptions focus on the multiplexer side, the demultiplexer side operates in a similar manner. After receiving a GbE bit stream, a de-serializer derives ten low-speed bit streams. If the data is 8 B/10 B encoded, a 10 B/8 B decoder decodes the data and produces eight 100 Base Ethernet channels. If the data is not encoded, the out bit streams of the de-serializer can be directly used as the data of the low-speed Ethernet channels.

Channel Marking

One challenge in implementing bit-level multiplexing is channel alignment and to obtain a correct channel mapping between the transmitter side and the receiver side. In the multiplexing scheme with 8 B/10 B encoding, as shown in FIG. 1, correct channel alignment is automatically attained when the receiving end performs 10 B/8 B decoding. This is because correct decoding requires correct channel alignment, and a 10 B/8 B decoder automatically searches for the correct alignment position for decoding. However, this automatic alignment function is not available in the multiplexing scheme without 8 B/10 B encoding, as shown in FIG. 2. Hence, it is important for the receiving side to properly align the channels when there are ten 100 Base channels and when 8 B/10 B encoding is not used.

One way to solve this problem is to mark one or more low-speed Ethernet channels with special bit patterns that can be recognized by the demultiplexer end, so that all the channels can be properly aligned and distributed based on their relative position with regard to the marked channel. Because each 100 Base Ethernet channel is typically 4 B/5 B encoded, it is possible to replace certain words with specially selected characters which do not occur in 4 B/5 B encoding. These specially selected characters will be the unique markings that can be easily recognized by the receiver side. For example, it is possible to replace the idles between Ethernet frames with proprietary idle characters that are do not occur in 4 B/5 B encoding.

Furthermore, a user may use more multiple unique characters to represent idles between Ethernet frames, while different unique characters also represent "0" and "1", besides Ethernet idles. This allows the system to carry additional information, which can be used for operation, administration, and management (OA&M) purposes.

Figure 3A:
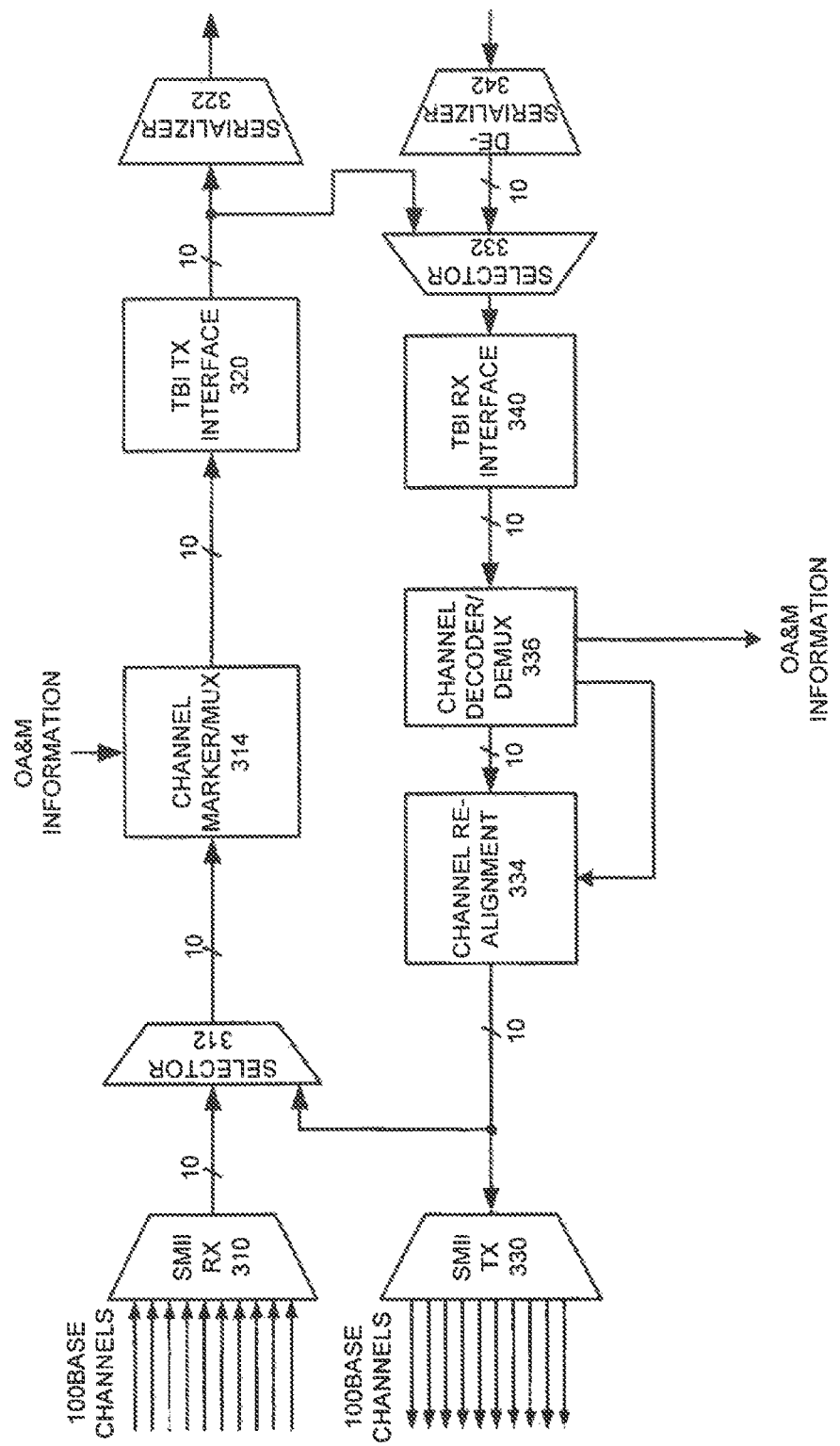
FIG. 3A illustrates an Ethernet bit-level multiplexer/demultiplexer without 8 B/10 B encoding and with channel-marking in accordance with an embodiment of the present invention.

FIG. 3A illustrates an Ethernet bit-level multiplexer/demultiplexer without 8 B/10 B encoding and with channel-marking in accordance with an embodiment of the present invention. The top half of FIG. 3A illustrates the multiplexing/transmitting portion of the system, and the bottom half of FIG. 3A illustrates the demultiplexing/receiving portion of the system.

As shown in FIG. 3A, ten receiver (RX) interfaces 310 receives ten individual 100 Base Ethernet channels. The output of each RX interface is an SMII bit stream. The corresponding ten bit streams then enter selector 312, which provides a loop-back function for testing purposes. The outputs of selector 312 then enters a channel marker/multiplexer 314, which marks one or more channels with unique idle characters. Channel marker/multiplexer 314 may also encode additional OA&M information with the unique idle characters. The output ten bit streams of channel marker/multiplexer 314 are fed into Ten-bit-interface (TBI) transmission (TX) interface 320, which subsequently transmits them to serializer 322. Note that serializer 332 typically resides in a different SERDES chip. The output of serializer 322 is a 1.25 GHz serial bit stream ready to be transmitted onto a GbE link.

In the receiving portion of FIG. 3A, a de-serializer 342 receives a 1.25 GHz bit stream from a GbE link and produces ten 125 MHz bit streams. These ten bit streams then enter selector 332 which allows loop-back for testing purposes. The outputs of selector 332 are fed into a TBI RX interface 340, which prepares the received bit streams for intra-chip processing. The output bit streams of TBI RX interface 340 then enter channel decoder/demultiplexer 336, which detects the unique idle characters and identifies the marked channel. Channel decoder/demultiplexer 336 in addition extracts the OA&M information encoded within the unique idle characters. A channel re-alignment mechanism 334 re-aligns the channels so that the demultiplexed channels can be distributed properly to their respective destinations based on each channel's relative position with regard to the marked channel. The properly re-aligned channels are then transmitted by ten TX interfaces 330 which have SMII inputs.

Figure 3B:
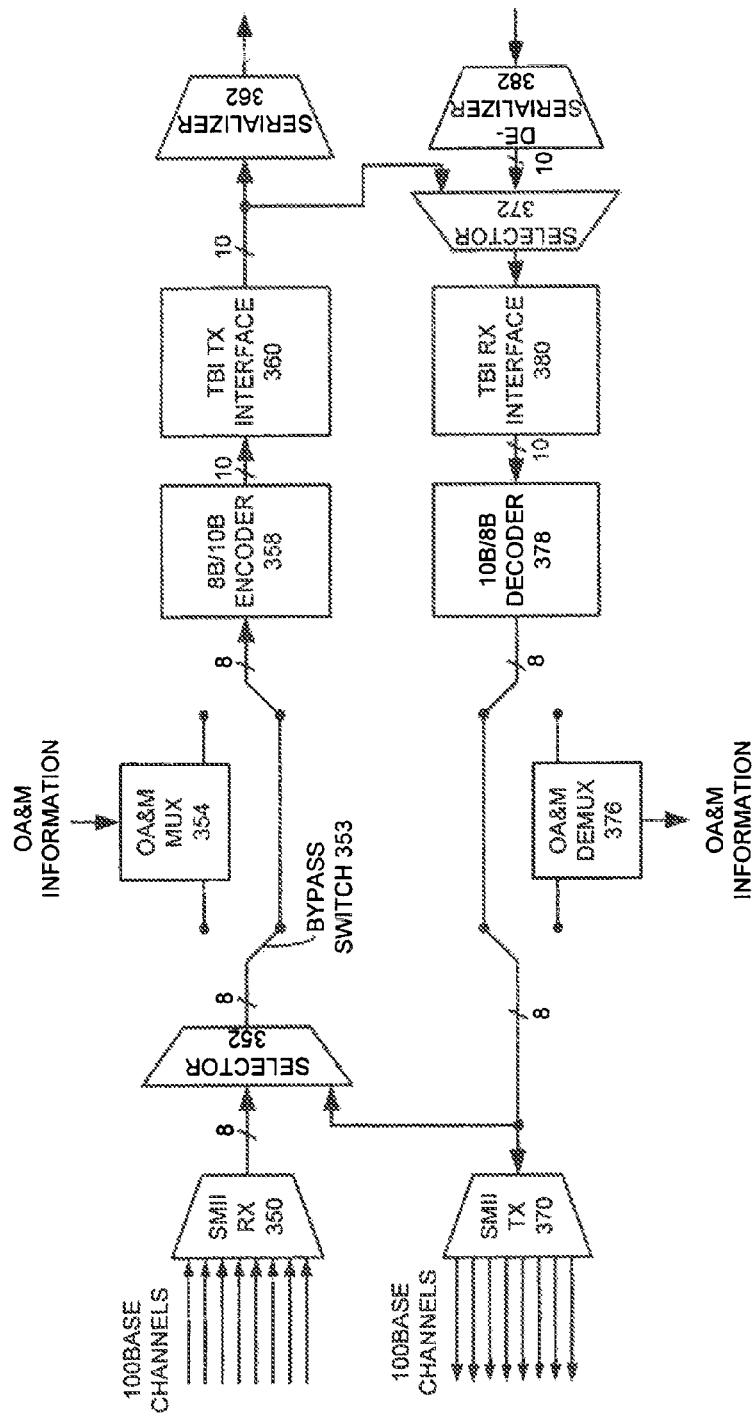
FIG. 3B illustrates an Ethernet bit-level multiplexer/demultiplexer with 8 B/10 B encoding and with optional OA&M multiplexing in accordance with an embodiment of the present invention.

FIG. 3B illustrates an Ethernet bit-level multiplexer/demultiplexer with 8 B/10 B encoding and with optional OA&M multiplexing in accordance with an embodiment of the present invention. The top half of FIG. 3B illustrates the multiplexing/transmitting portion of the system, and the bottom half of FIG. 3B illustrates the demultiplexing/receiving portion of the system.

As shown in FIG. 3B, eight receiver (RX) interfaces 350 receives eight individual 100 Base Ethernet channels. The output of each RX interface is an SMII bit stream. The corresponding eight bit streams then enter selector 352, which provides a loop-back function for testing purposes. The outputs of selector 352 then enters a bypass switch 353, which allows one or more channels to be marked by OA&M multiplexer 354 to carry OA&M information. Alternatively, the bit streams can bypass OA&M multiplexer 354 and directly enter 8 B/10 B encoder 358, which produces ten bit streams. TBI TX interface 360 subsequently transmits them to serializer 362, which typically resides in a different SERDES chip. The output of serializer 362 is a 1.25 GHz serial bit stream ready to be transmitted onto a GbE link.

In the receiving portion of FIG. 3B, a de-serializer 382 receives a 1.25 GHz bit stream from a GbE link and produces ten 125 MHz bit streams. These ten bit streams then enter selector 372 which allows loop-back for testing purposes. The outputs of selector 372 then enter a TBI RX interface 380, which prepares the received bit streams for intra-chip processing. The ten bit streams are decoded by 10 B/8 B decoder 378, which produces eight bit streams.

The outputs of 10 B/8 B decoder 338 then enter a bypass switch, which allows the encoded OA&M information on one or more channels to be extracted by OA&M demultiplexer 376. Alternatively, the bit streams can bypass OA&M demultiplexer 376 and directly enter eight TX interfaces 370 with SMII inputs.

Note that although FIG. 3A and FIG. 3B illustrates two modes of operation, i.e., with and without 8 B/10 B encoding and channel marking, it is possible to include both operational modes in a single chip. Such a chip allows a user to configure the relevant bus width to be eight or ten bits, and to choose to use or bypass the channel-marking and/or OA&M multiplexing functions. In addition, a receiving chip may automatically detect whether the received 1.25 GHz is 8 B/10 B encoded by determining whether the bit stream contains only ten-bit words used for 8 B/10 B encoding.

Exemplary Application

Figure 4:
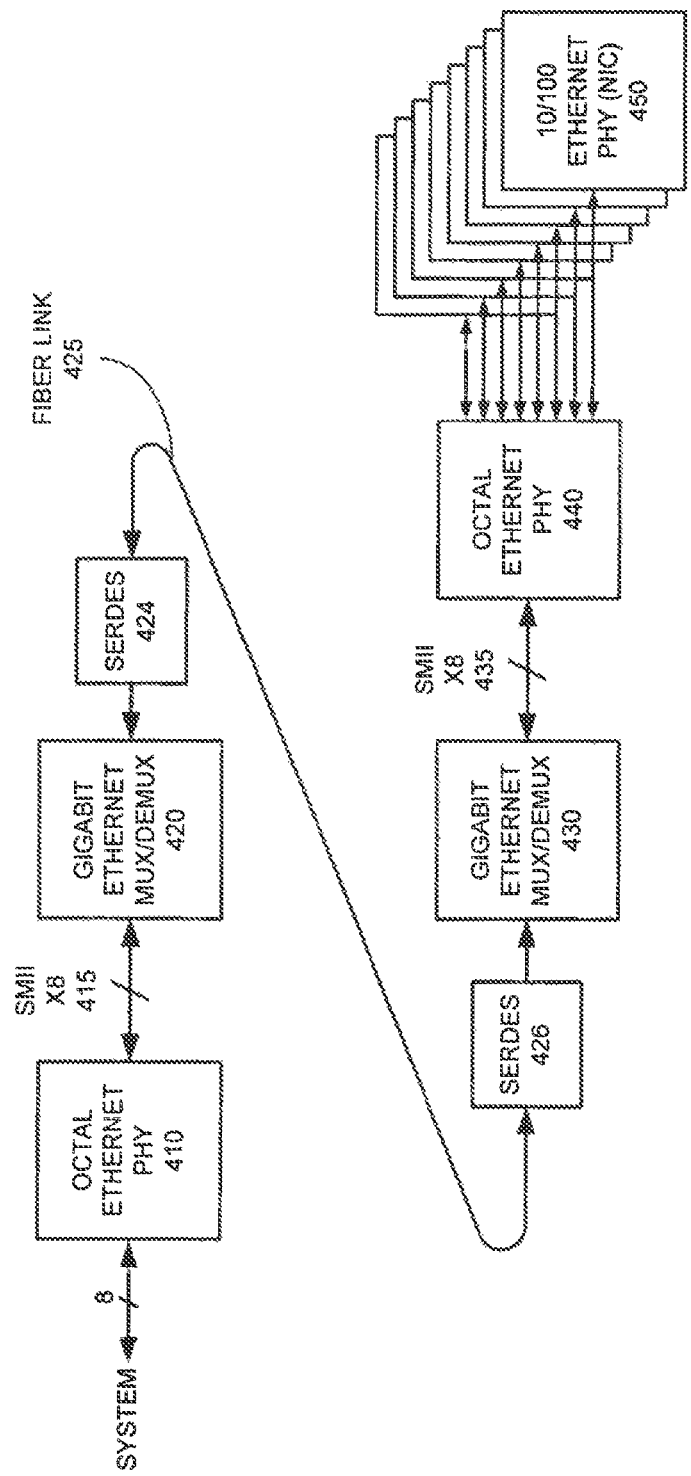
FIG. 4 illustrates an eight-channel point-to-point application utilizing the bit-level multiplexer/demultiplexer in accordance with an embodiment of the present invention.

FIG. 4 illustrates an eight-channel point-to-point application utilizing the bit-level multiplexer/demultiplexer in accordance with an embodiment of the present invention. In this example, an octal Ethernet PHY interface 410 is coupled to eight 100 Base Ethernet channels. These channels may couple to a system that is, for example, a part of an Ethernet switch. Octal Ethernet PHY interface 410 contains eight individual PHY interfaces, each of which produce an SMII bit stream. The eight SMII bit streams 415 enter a GbE multiplexer/demultiplexer 420, which produces ten 125 MHz bit streams. An external SERDES device 424 in turn multiplexes these ten 125 MHz bit streams onto one 1.25 GHz GbE channel.

The resulting 1.25 GHz bit stream travels across a fiber GbE link 425 and reaches a user-side SERDES device 426, which produces ten 125 MHz bit streams. GbE multiplexer/demultiplexer 430 receives these ten bit streams, produces eight SMII bit streams 435 and feeds these eight bit streams to octal Ethernet PHY interface 440, which subsequently transmits these Ethernet channels to individual user Ethernet PHY interfaces (network interface cards (NIC)), such as NIC 450.

System Operation

Figure 5A:
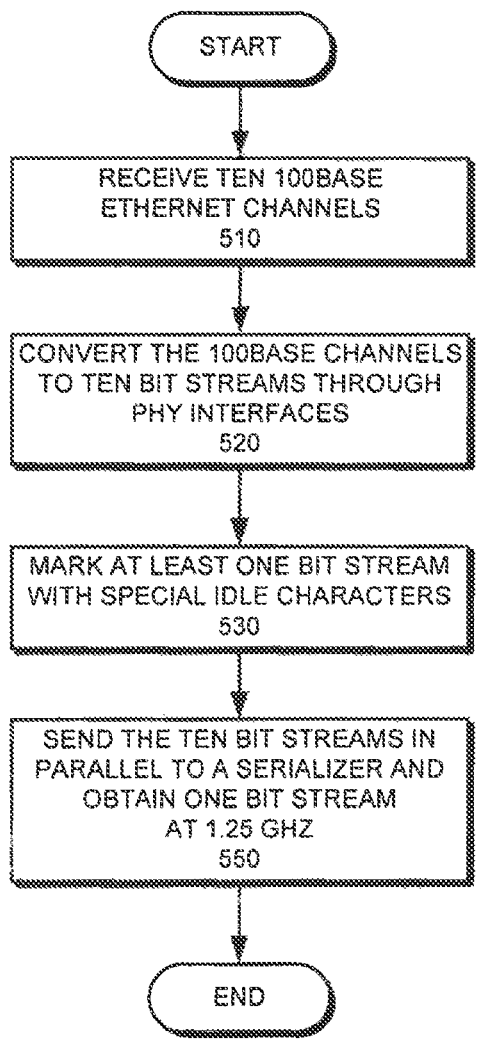
FIG. 5A presents a flow chart illustrating the process of multiplexing ten 100 Base Ethernet channels onto a GbE link without 8 B/10 B encoding in accordance with an embodiment of the present invention.

FIG. 5A presents a flow chart illustrating the process of multiplexing ten 100 Base Ethernet channels onto a GbE link without 8 B/10 B encoding in accordance with an embodiment of the present invention. The system starts by receiving ten 100 Base Ethernet channels (step 510). The system then converts the 100 Base channels to ten bit streams through PHY interfaces (step 520). Next, the system marks at least one bit stream with special idle characters (step 530). Subsequently, the system sends the ten bit streams in parallel to a serializer, from which the system obtains one bit stream at 1.25 GHz (step 550).

Figure 5B:
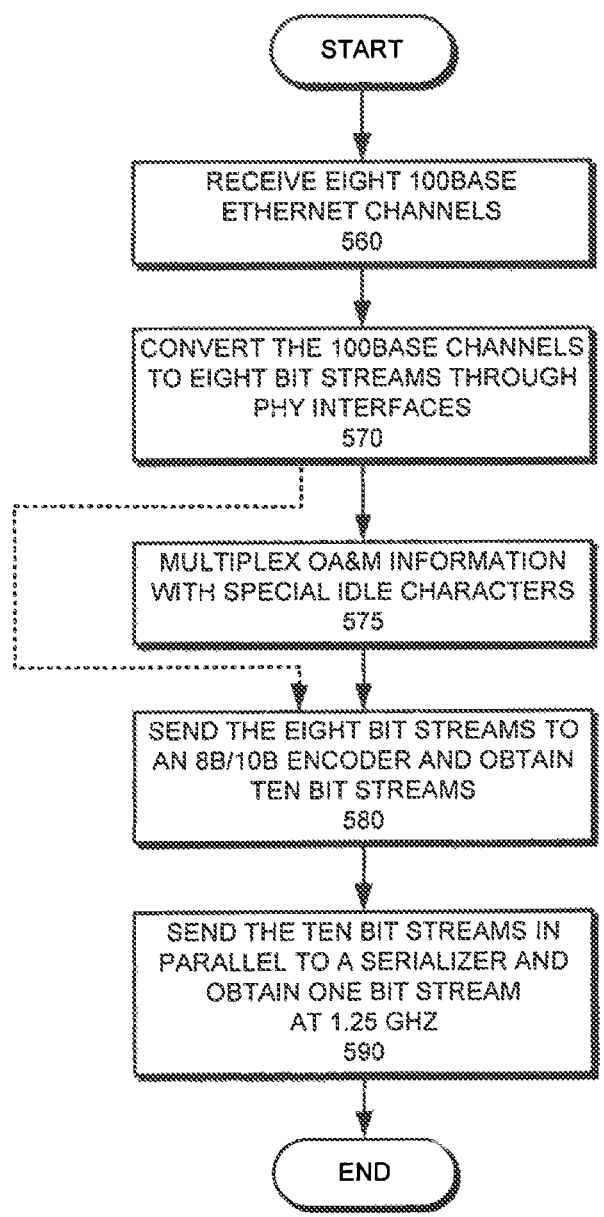
FIG. 5B presents a flow chart illustrating the process of multiplexing eight 100 Base Ethernet channels onto a GbE link with 8 B/10 B encoding in accordance with an embodiment of the present invention.

FIG. 5B presents a flow chart illustrating the process of multiplexing eight 100 Base Ethernet channels onto a GbE link with 8 B/10 B encoding in accordance with an embodiment of the present invention. The system starts by receiving eight 100 Base Ethernet channels (step 560). The system then converts the 100 Base channels to eight bit streams through PHY interfaces (step 570). Next, the system multiplexes OA&M information with special idle characters onto one or more channels (step 575). Alternatively, the system bypasses the OA&M multiplexing (dotted line) and directly sends the eight bit steams to an 8 B/10 B encoder and obtains ten bit streams (step 580). Subsequently, the system sends the ten bit streams in parallel to a serializer, from which the system obtains one bit stream at 1.25 GHz (step 590).

Figure 6A:
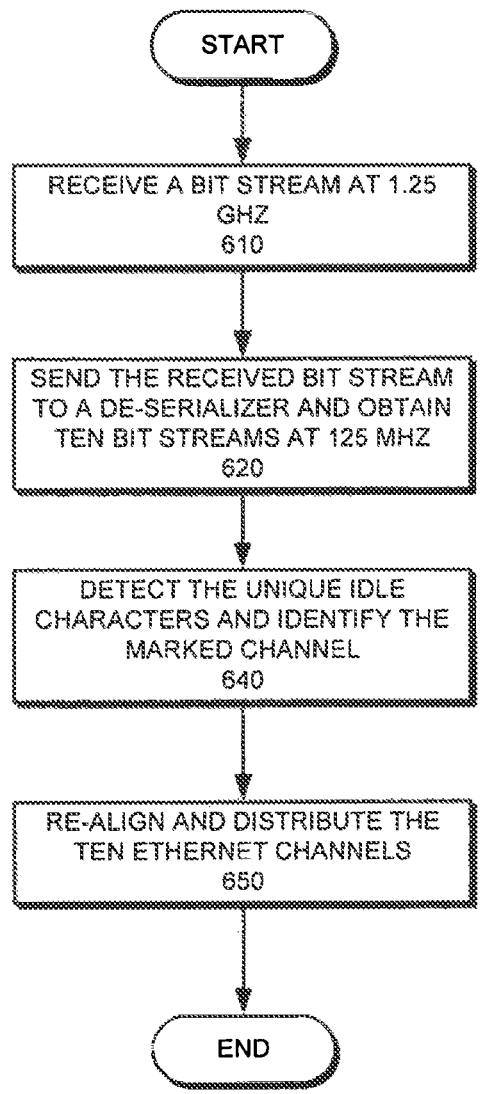
FIG. 6A presents a flow chart illustrating the process of demultiplexing a GbE link into ten 100 Base Ethernet channels without 10 B/8 B decoding in accordance with an embodiment of the present invention.

FIG. 6A presents a flow chart illustrating the process of demultiplexing a GbE link into ten 100 Base Ethernet channels without 10 B/8 B decoding in accordance with an embodiment of the present invention. The system starts by receiving a bit stream at 1.25 GHz from a GbE link (step 610). The system then sends the received bit stream to a de-serializer and obtains ten bit streams at 125 MHz (step 620). Next, the system detects the unique idle characters and identifies the marked channel (step 640). The system then re-aligns and properly distributes the ten Ethernet channels (step 650).

Figure 6B:
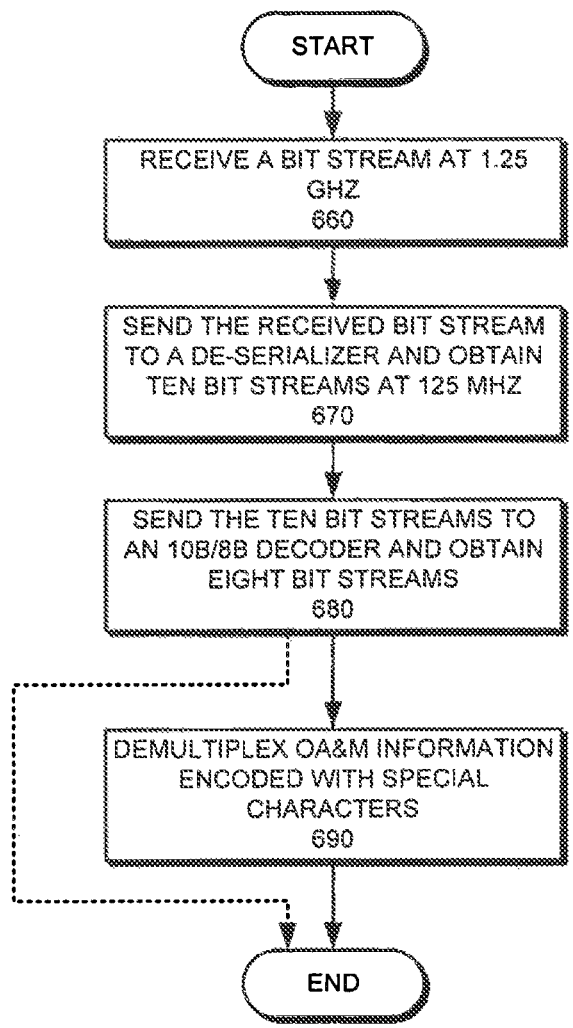
FIG. 6B presents a flow chart illustrating the process of demultiplexing a GbE link into eight 100 Base Ethernet channels with 10 B/8 B decoding in accordance with an embodiment of the present invention.

FIG. 6B presents a flow chart illustrating the process of demultiplexing a GbE link into eight 100 Base Ethernet channels with 10 B/8 B decoding in accordance with an embodiment of the present invention. The system starts by receiving a bit stream at 1.25 GHz from a GbE link (step 660). The system then sends the received bit stream to a de-serializer and obtains ten bit streams at 125 MHz (step 670). Next, the system sends the ten bit streams to an 10 B/8 B decoder and obtains eight bit streams (step 680). The system subsequently demultiplexes OA&M information encoded with special characters on one or more of the channels (step 690). Alternatively, the system bypasses the OA&M demultiplexing (dotted line) and directly uses the decoded eight channels.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for bit-level demultiplexing a high-speed channel, comprising:
   receiving a serial bit stream from the high-speed channel;
   generating a plurality of bit streams from the serial bit stream, wherein the plurality of bit streams correspond to a marked channel and a plurality of unmarked channels; and
   if ten low-speed Ethernet channels are to be transmitted, producing the ten low-speed Ethernet channels by aligning the unmarked channels based upon their respective positions with regard to the marked channel.

2. The method of claim 1, further comprising:
   sending the plurality of bit streams to a decoder, wherein the decoder is configured to detect a special bit pattern marking the marked channel.

3. The method of claim 2, wherein the special bit pattern comprises a plurality of characters corresponding to a combination of logical zeros and logical ones.

4. The method of claim 2, wherein the special bit pattern comprises a plurality of proprietary idle characters.

5. The method of claim 1, further comprising:
   if eight low-speed Ethernet channels are to be transmitted, sending the plurality of bit streams to a decoder to obtain the eight low-speed Ethernet channels.

6. The method of claim 5, further comprising:
   decoding a ten parallel bit word into an eight parallel bit word.

7. The method of claim 1,
   wherein the low-speed Ethernet channels are 125 MHz Ethernet channels; and
   wherein the high-speed channel has a data rate of 1.25 GHz.

8. The method of claim 1, further comprising:
   if the ten low-speed Ethernet channels are to be transmitted:
      obtaining ten bit streams from the serial bit stream, and
      decoding the ten bit streams to detect a special bit pattern marking the marked channel in the ten low-speed Ethernet channels, wherein the other nine channels in the ten low-speed Ethernet channels comprise the unmarked channels.

9. An apparatus for bit-level demultiplexing a high-speed channel, comprising:
   a receiving mechanism configured to receive a serial bit stream from the high-speed channel;
   a deserializer configured to generate a plurality of bit streams from the serial bit stream, wherein the plurality of bit streams correspond to a marked channel and a plurality of unmarked channels; and
   an alignment circuit configured to produce ten low-speed Ethernet channels by aligning the unmarked channels based upon their respective positions with regard to the marked channel.

10. The apparatus of claim 9, further comprising:
    a decoding circuit configured to detect a special bit pattern marking the marked channel.

11. The apparatus of claim 10, wherein the special bit pattern comprises a plurality of characters corresponding to a combination of logical zeros and logical ones.

12. The apparatus of claim 10, wherein the special bit pattern comprises characters which do not occur in 4B/5B encoding.

13. The apparatus of claim 10, wherein the special bit pattern comprises a plurality of proprietary idle characters.

14. The apparatus of claim 9, further comprising:
    a 10B/8B decoder configured to obtain eight low-speed Ethernet channels from the plurality of bit streams.

15. The apparatus of claim 14, wherein the 10B/8B decoder is configured to decode every ten parallel bit word into an eight parallel bit word.

16. The apparatus of claim 9,
    wherein the low-speed Ethernet channels are 125 MHz Ethernet channels; and
    wherein the high-speed channel has a data rate of 1.25 GHz.

17. An apparatus for bit-level demultiplexing a high-speed channel, comprising:
    a deserializer configured to generate a plurality of bit streams from a serial bit stream received from the high-speed channel, wherein the plurality of bit streams correspond to a marked channel and a plurality of unmarked channels;
    a 10B/8B decoder configured to obtain eight low-speed Ethernet channels from the plurality of bit streams; and
    an alignment circuit configured to produce ten low-speed Ethernet channels by aligning the unmarked channels based upon their respective positions with regard to the marked channel.

18. The apparatus of claim 17, further comprising:
    a decoding circuit configured to detect a special bit pattern marking the marked channel.

19. The apparatus of claim 17, further comprising:
    a receiving circuit configured to receive the serial bit stream from the high-speed channel.

20. The apparatus of claim 17,
    wherein the low-speed Ethernet channels are 125 MHz Ethernet channels; and
    wherein the high-speed channel has a data rate of 1.25 GHz.

* * * * *